(12) United States Patent
Chaturvedi et al.

(10) Patent No.: US 12,168,340 B2
(45) Date of Patent: Dec. 17, 2024

(54) FORMABLE FILMS, LAMINATE STRUCTURES, AND RELATED METHODS

(71) Applicant: Flex Films (USA), Inc., Elizabethtown, KY (US)

(72) Inventors: Ashok Chaturvedi, New Delhi (IN); Steven Sargeant, Elizabethtown, KY (US); Sudhir Naik, Noida (IN); Sanjeev Gupta, Noida (IN); Dipak Boral, Noida (IN); Pramod Sirsamkar, Noida (IN)

(73) Assignee: Flex Films (USA), Inc., Elizabethtown, KY (US)

( * ) Notice: Subject to any disclaimer, the term of this patent is extended or adjusted under 35 U.S.C. 154(b) by 0 days.

(21) Appl. No.: 17/614,855

(22) PCT Filed: May 26, 2020

(86) PCT No.: PCT/IN2020/050469
§ 371 (c)(1),
(2) Date: Nov. 29, 2021

(87) PCT Pub. No.: WO2020/240584
PCT Pub. Date: Dec. 3, 2020

(65) Prior Publication Data
US 2022/0234803 A1     Jul. 28, 2022

(30) Foreign Application Priority Data

May 29, 2019  (IN) .............................. 201911021324

(51) Int. Cl.
*B32B 27/36* (2006.01)
*B32B 15/09* (2006.01)
(Continued)

(52) U.S. Cl.
CPC .............. *B32B 27/36* (2013.01); *B32B 15/09* (2013.01); *B32B 15/20* (2013.01); *B32B 27/08* (2013.01);
(Continued)

(58) Field of Classification Search
CPC ......... B32B 27/36; B32B 15/09; B32B 15/20; B32B 27/08; B32B 27/20; B32B 2250/03;
(Continued)

(56) References Cited

U.S. PATENT DOCUMENTS

| | | |
|---|---|---|
| 5,637,366 A | 6/1997 | Davis et al. |
| 9,656,447 B2 | 5/2017 | Sakellarides |

(Continued)

FOREIGN PATENT DOCUMENTS

| | | |
|---|---|---|
| GB | 1337331 A | 11/1973 |
| WO | 2007085380 A1 | 8/2007 |

(Continued)

OTHER PUBLICATIONS

Extended European search report dated Jun. 3, 2022 pertaining to European application No. 20814447.7, pp. 1-7.
(Continued)

*Primary Examiner* — Betelhem Shewareged
(74) *Attorney, Agent, or Firm* — Dinsmore & Shohl

(57) ABSTRACT

Embodiments of the disclosure relate to a blister package having a laminate structure that is heat-sealable to a lacquer layer on strain-hardened aluminum foil. The blister package includes a lid layer comprising a strain-hardened aluminum foil, a lacquer layer on a sealing surface of the strain-hardened aluminum foil and a laminate structure sealed directly to the lacquer layer. The laminate structure includes a multilayer film and a plurality of wells formed therethrough. The multilayer film includes a first formable layer of a thermoplastic material and a sealing layer of a copoly- (Continued)

ester material. The sealing layer overlies the first formable layer and has an outer surface opposite the first formable layer. The sealing layer has crystallinity from 5% to 20% as measured by differential scanning calorimetry (DSC). The outer surface of the sealing layer is sealed directly against the lacquer layer.

18 Claims, 4 Drawing Sheets

(51) Int. Cl.
 B32B 15/20 (2006.01)
 B32B 27/08 (2006.01)
 B32B 27/20 (2006.01)
(52) U.S. Cl.
 CPC .......... *B32B 27/20* (2013.01); *B32B 2250/03* (2013.01); *B32B 2255/06* (2013.01); *B32B 2264/102* (2013.01); *B32B 2307/31* (2013.01); *B32B 2307/518* (2013.01)
(58) Field of Classification Search
 CPC .......... B32B 2255/06; B32B 2264/102; B32B 2307/31; B32B 2307/518
 USPC ........................................................ 428/200
 See application file for complete search history.

(56) References Cited

U.S. PATENT DOCUMENTS

| | | |
|---|---|---|
| 10,131,122 B2 | 11/2018 | Sargeant et al. |
| 2004/0052993 A1 | 3/2004 | Dawes |
| 2004/0097157 A1 | 5/2004 | Cosentino |
| 2005/0079307 A1 | 4/2005 | Blum et al. |
| 2005/0276525 A1* | 12/2005 | Hebert ................ B32B 37/1292 383/203 |
| 2011/0081543 A1* | 4/2011 | Lee ......................... B32B 27/36 428/458 |
| 2016/0368252 A1 | 12/2016 | Sargeant et al. |
| 2019/0016099 A1* | 1/2019 | Sargeant .............. C08G 63/199 |
| 2022/0234803 A1* | 7/2022 | Chaturvedi ........... B32B 27/302 |

FOREIGN PATENT DOCUMENTS

| | | |
|---|---|---|
| WO | 2008008381 A2 | 1/2008 |
| WO | 2018041415 A1 | 3/2018 |

OTHER PUBLICATIONS

Indian Examination Report dated Jun. 19, 2020, pertaining to Indian Patent Application No. 201911021324.
International Search Report and Written Opinion dated Sep. 8, 2020, pertaining to Int'l Patent Application No. PCT/IN2020/050469.

* cited by examiner

FORMABLE FILMS, LAMINATE STRUCTURES, AND RELATED METHODS

TECHNICAL FIELD

The present specification generally relates to laminate structures having formable films and more specifically to a blister package having a laminate structure that is heat-sealable to a lacquer layer on strain-hardened aluminum foil.

BACKGROUND

Blister packages are well-known for packaging of food products, medicinal products, and other industrial goods. Blister packages are formed from laminate structures having one or more formable films. The laminate structures are sealed to a lid layer after the product is stored within wells formed therein. The lid layer is typically formed from strain-hardened aluminum foil and a sealing surface of the lid is coated with a lacquer layer for enhancing the bond between the lid layer and the laminate structure.

The bonding performance of the lacquer layer on the sealing surface of the lid layer varies widely depending on the nature and composition of the formable films used in the laminate structure. In some cases, an outer layer of the laminate structure may have an additional coating layer such as Vinoyl 15/45M manufactured by Wacker Polymers to improve bonding performance. But such an additional coating layer incurs increased manufacturing complexity, cost and can cause poorer performance of the blister package. In other cases, when the formable films are made of thermoplastic materials such as uncoated polyethylene terephthalate (PET), biaxially oriented Nylon (BON), polypropylene and similar materials, the laminate structures do not bond well with the lid layer.

SUMMARY

Embodiments of the disclosure relate to a blister package having a laminate structure that is heat-sealable to a lacquer layer on strain-hardened aluminum foil. In one embodiment, a multilayer film includes a first formable layer of a thermoplastic material and a sealing layer of a copolyester material. The sealing layer overlies the first formable layer and has an outer surface opposite the first formable layer. The sealing layer has a crystallinity from 5% to 20% as measured by differential scanning calorimetry (DSC) which is a technique well known to those skilled in the art.

In another embodiment, a blister package for packaging a product is disclosed. The blister package includes a lid layer comprising a strain-hardened aluminum foil, a lacquer layer on a sealing surface of the strain-hardened aluminum foil and a laminate structure sealed directly to the lacquer layer. The laminate structure includes a multilayer film and a plurality of wells formed therethrough. The multilayer film includes a first formable layer of a thermoplastic material and a sealing layer of a copolyester material. The sealing layer overlies the first formable layer and has an outer surface opposite the first formable layer. The sealing layer has a crystallinity from 5% to 20% as measured by differential scanning calorimetry (DSC). The outer surface of the sealing layer is sealed directly against the lacquer layer of the foil lid.

In yet another embodiment, a method of preparing a blister package is disclosed. The method includes the step of laminating a lid layer and a multilayer laminate structure under pressure to form the blister package. The lid layer includes a strain-hardened aluminum foil having a lacquer layer on a sealing surface of the strain-hardened aluminum foil. The laminate structure includes a multilayer film having a first formable layer of a thermoplastic material and a sealing layer of a copolyester material. The sealing layer overlies the first formable layer and has an outer surface opposite the first formable layer. The sealing layer has a crystallinity from 5% to 20% as measured by differential scanning calorimetry (DSC). During the step of lamination, the outer surface of the sealing layer is contacted directly against the lacquer layer of the lid.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A is a schematic diagram of a sealing process of bonding a lid layer with the exemplary laminate structure of FIG. 2, according to one or more embodiments shown and described herein.

DETAILED DESCRIPTION

Figure 1A:
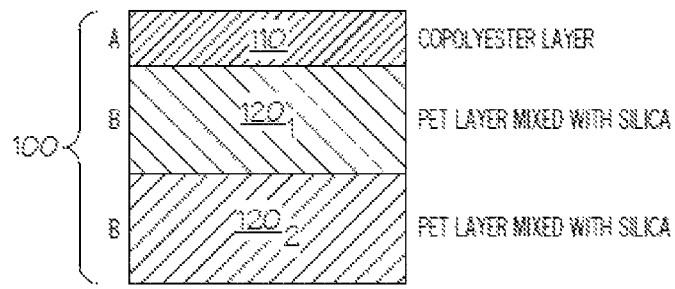
FIGS. 1A, 1B, and 1C are schematic diagrams of three exemplary multilayer films having layers of formable films, according to one or more embodiments shown and described herein.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as is commonly understood by one of skill in the art to which the invention(s) belong. All patents, patent applications, published applications and publications, databases, websites and other published materials referred to throughout the entire disclosure herein, unless noted otherwise, are incorporated by reference in their entirety. In the event that there is a plurality of definitions for terms herein, those in this section prevail. Where reference is made to a URL or other such identifier or address, it understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims. Thus, for example, reference to "a layer" includes a plurality of such layers, and so forth, unless indicated otherwise.

Furthermore, unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Embodiments described herein are directed to a blister package having a laminate structure that is heat-sealable to a lacquer layer on a strain-hardened aluminum foil. The laminate structure includes a sealing layer overlying one or more layers of formable films. The sealing layer is made of a copolyester material and can be co-extruded with layers of formable films to form the laminate structure. Accordingly, the inventors have discovered, an additional coating layer on the outer surface of the laminate structure is not necessary for bonding the laminate structure to a lid layer of strain-hardened aluminum foil. This reduces cost and complexity in the manufacturing process while also improving the overall construction of the blister package formed from the laminate structure.

Figure 1B:
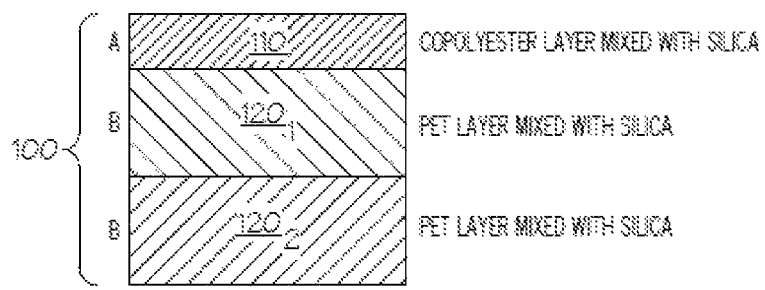
Figure 1C:
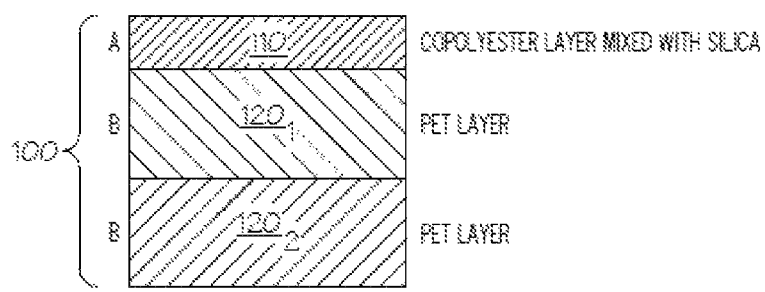

Referring now to FIGS. 1A, 1B, and 1C, schematic diagrams of three exemplary multilayer films 100 having layers of formable films 120₁ are depicted. Each of the embodiments in FIGS. 1A-1C include a multilayer film 100 of A/B/B structure having a sealing layer 110 overlying a first formable layer 120₁ and a second formable layer 120₂, where the first formable layer 120₁ is interposed between the sealing layer 110 and the second formable layer 120₂. While the embodiments shown in FIGS. 1A-1C show only two formable layers 120₁ and 120₂, the multilayer film 100 is not restricted as such and may contain one or multiple formable layers 120₁, 120₂, 120₃, 120₄, . . . , 120ₙ depending on the particular application.

In some embodiments, the sealing layer 110 is made from a copolyester material and has a thickness from about 1.5 microns to about 4 microns. The material chosen for the sealing layer 110 is required to be compatible with both the material of the formable layers 120₁, 120₂ and a multilayer extrusion process of forming the multilayer film 100. In some embodiments, the sealing layer 110 is formed from a copolyester material such as, but not limited to, copolyesters of isophthalic acid, copolyesters of ethylene glycol, copolyesters of diethylene glycol (DEG), copolyesters of triethylene glycol (TEG), copolyesters of cyclohexanedimethanol (CHDM)-modified PET, copolyesters of n-propylene glycol, and copolyesters of n-butylene glycol.

In example embodiments, the copolyester material is formed by a catalyzed polycondensation reaction between one or more glycol components and one or more diacid components. In non-limiting examples, the glycol components may be ethylene glycol, DEG, TEG, CHDM, n-propylene glycol, n-butylene glycol and similar linear and branched diols. In non-limiting examples, the diacid components may be purified terephthalic acid (PTA), commoners of adipic acid, sebacic acid, succinic acid and similar linear and branched diacids.

In some embodiments, the copolyester material forming the sealing layer 110 has physical properties (e.g. intrinsic viscosity) that render heat-sealable characteristics to the copolyester material and improves interfacial compatibility with the material of the formable layers 120₁, 120₂ such that the sealing layer 110 can be co-extruded at a high temperature. In some embodiments, the copolyester material has an intrinsic viscosity from about 0.5 deciliters/gram to about 1.0 deciliters/gram, preferably from about 0.6 deciliters/gram to about 0.7 deciliters/gram. Intrinsic viscosity (IV) of a polymer reflects the property of a polymer in solution to increase the viscosity of the solution. Intrinsic viscosity is defined as the ratio of the solution's specific viscosity (the relative viscosity of the polymer solution of known concentration minus one) to the concentration of the solute extrapolated to zero concentration. Thus, the intrinsic viscosity is the limiting value of the ratio of specific viscosity and concentration at zero concentration. Intrinsic viscosity can be determined by measuring the relative viscosity of the solution at several different concentrations and then extrapolating the specific viscosity at zero concentration.

Intrinsic viscosity can also be determined by measuring the inherent viscosity at infinite dilution of the polymer, where inherent viscosity is the ratio between the natural logarithm of relative viscosity (ratio of the viscosities of the polymer solution and the pure solvent at the same temperature) and the concentration. Inherent viscosity can be measured using a method outlined in ASTM D 4603 (Standard Test Method for Determining Inherent Viscosity of Polyethylene Terephthalate (PET) by Glass Capillary Viscometer).

In some embodiments, the copolyester material has crystallinity from 1% to 25%, such as from 5% to 20%, from 5% to 15%, from 5% to 10%, or from 10% to 20%, for example, as measured by differential scanning calorimetry (DSC). If the copolyester material has a higher crystallinity, then it may often be heated and quenched quickly in a commercial coextrusion process such that the crystallinity is reduced to be within the range noted above.

DSC provides a known analytical technique for determining polymer crystallinity (and other morphological characteristics) based on the heat required to melt the polymer. As a polymer sample is heated and cooled over a period of time within a predetermined range of temperatures, the differential heat flow into or out of the polymer is measured using sensors and plotted. As a polymer is initially heated, the heat capacity of the polymer increases linearly as it passes the glass transition temperature ($T_g$). Subsequently, when the polymer is heated beyond the glass transition temperature $T_g$, the polymer molecules gain more and more energy until they form ordered crystalline structures. Increase in crystallinity allows the polymer to release extra heat ($\Delta Hc$) such that the temperature drops to the polymer's cold crystalline temperature (T). Further application of heat however, begins to break down the ordered crystalline structures and the polymer gradually moves onto an amorphous phase and eventually melts at a melting temperature ($T_m$) upon absorbing sufficient heat ($\Delta Hm$). The data plotted by DSC enables the measurement of specific heat capacity, heat of transition, the temperature of phase changes and the rate of heat flow into or out of a polymer material both as a function of time and temperature. The percent crystallinity of a polymer is measured using the following equation:

$$\% \text{ crystallinity} = [\Delta Hm - \Delta Hc] * 100\% / \Delta Hm°, \quad \text{(Equation 1)}$$

where:
$\Delta Hm$=heat of melting (measured in Joules/gram)
$\Delta Hc$=heat of cold crystallization (measured in Joules/gram)
$\Delta Hm°$=heat of melting of a fully crystalline polymer (measured in Joules/gram and is a reference value commonly known for different polymers)

It is believed that a crystallinity from 5% to 20% as measured by DSC provides the copolyester material of the sealing layer 110 an ability to seal directly to a lacquer layer on strain-hardened aluminum foil, by application of heat and pressure alone, without the need for an additional coating or adhesive layer. The seal strength of the sealing layer 110 thus formed has been experimentally verified, as described in Example A below.

In some embodiments, the sealing layer 110 may further contain silica, alumina, or a combination thereof mixed in with the copolyester material. Dry particles of silica, alumina, or a combination thereof are blended with one or more layers of the copolyester material having low viscosity and subsequently polymerized together to form the blended sealing layer 110.

The sealing layer 110 has an outer surface 112 that is opposite to an inner surface 114 facing the first formable layer $120_1$. The outer surface 112 of the sealing layer 110 is heat-sealable directly to a lacquer layer 354 coated on a strain-hardened aluminum foil 352 (shown in FIG. 3A). In some embodiments, the sealability between the sealing layer 110 and the lacquer layer 354 can be observed starting at a temperature of about 85° C.

In some embodiments, one or more of the formable layers $120_1$ is formed from a thermoplastic material capable of thermoforming or cold-forming such as, but not limited to, polyethylene, polypropylene, nylon, polystyrene, polyethylene terephthalate (PET), polylactic acid, and polyvinyl chloride (PVC). In some embodiments, one or more of the formable layers $120_1$ is formed from a biaxially-oriented PET layer having a metaphase evidenced by a metaphase transition at about 180° C. to about 200° C. as measured by DSC upon a first heating and a molded volume of greater than or equal to about 200%. In one example, the first formable layer $120_1$ may be formed from a biaxially-oriented PET layer having a metaphase evidenced by a metaphase transition at about 180° C. to about 200° C. as measured by DSC upon a first heating and a molded volume of greater than or equal to about 200%. In another example, the second formable layer $120_2$ may be, additionally or alternatively, formed from a biaxially-oriented PET layer having a metaphase evidenced by a metaphase transition at about 180° C. to about 200° C. as measured by DSC upon a first heating and a molded volume of greater than or equal to about 200%.

In this context, and as used herein, the term "metaphase" refers to an amorphous phase induced in a formable film that renders it excellent formability (e.g., thermoformability) and tensile strength, and which is not found in standard biaxially-oriented PET films. Such a metaphase can be induced and the resulting properties obtained by orienting the biaxially-oriented PET film layer at reduced temperatures and draw ratios, and subsequently allowing the biaxially-orienting PET film layer to relax to a greater extent than is done in the production of other thermoformable films. The metaphase is readily observed in the DSC profile of the formable films of biaxially-oriented PET as a deflection point in the heat-flow curves at approximately 180° C. to about 200° C. (e.g., 190° C.) upon first heating experiments. Being a metastable phase, second heating or annealing experiments then will not reveal this phase as the metaphase will be squelched.

Not wishing to be bound by any particular theories, it is believed that the metaphase is a quasi-stable phase intermediate in composition between that of the crystalline and amorphous materials typical of a semi-crystalline thermoplastic material. In particular, it is believed that the phase is a tied amorphous phase associated with the crystalline structure within the film. This tied amorphous phase has additional latent elongation properties and thus allows for significantly higher formability within the formable films of biaxially-oriented PET.

In some embodiments, the formable films of biaxially-oriented PET can be described as having a metastable phase having a phase transition temperature less than the crystalline melting point of the film as measured by DSC. In some embodiments, the phase transition temperature is about 40° C. less, about 45° C. less, about 50° C. less, about 55° C. less, about 60° C. less, or about 65° C. less than the crystalline melting point of the film as measured by DSC.

The phrase "molded volume" refers to the amount of increase in the volume exhibited by a particular film layer before breakage occurs. In this regard, molded volume is typically measured by making use of heat and reduced pressure experiments by which thin film materials are placed over a cavity mold and, under heat and reduced pressure, molded into a half-moon shape. Generally, such experimental procedures are optimized to produce the maximum molded volume before breakage occurs. The relative volume measured before breakage occurs is then normalized to a traditionally manufactured biaxially-oriented PET film that would give 100% normalized volume under optimal conditions.

As an effect of the metaphase transition present in the formable films of biaxially-oriented PET, the molded volume of any well that is formed therein becomes greater than 200% due to an increase in diameter of the well. The increase in volume can be measured by comparing the amount of water or other liquid required to completely fill the well before and after the metaphase transition is achieved by the formable film.

In some embodiments, one or more of the formable layers $120_i$ may further include silica, alumina, or a combination thereof mixed in with the thermoplastic material. In one example, the first formable layer $120_1$ may contain silica, alumina, or a combination thereof mixed in with the thermoplastic material. In another example, the second formable layer $120_2$ may, additionally or alternatively, contain silica, alumina, or a combination thereof mixed in with the thermoplastic material. The process of blending dry particles of silica, alumina, or a combination thereof in the thermoplastic material is substantially similar to the process of blending the same within copolyester material of the sealing layer 110, as described above.

In some embodiments, the one or more formable layers $120_i$ are prepared through the use of conventional sequential biaxial orientation machines having a single-screw mainline extrusion train and a twin-screw sub-extrusion process. Other modifications to the standard machine set-ups are also possible and well known to those skilled in the art. In this regard, in some embodiments, standard PET pellets having a desired intrinsic viscosity can be fed into the main extrusion line, while pellets of another composition can be fed into a sub-extrusion process. For instance, a blend of standard PET pellets and silica-filled PET pellets can be fed in to the sub-extrusion process. The materials can then be melted separately and laminated together in a feed-block to produce a desired multilayer molten structure (e.g., an A/B/A molten structure) in an extrusion die. The laminated PET layers emerging from the extrusion die are then quenched on a chilled casting drum to produce a thick, amorphous film structure having a thickness of about 9 μm, about 12 μm, about 15 μm, about 20 μm, about 23 μm, about 25 μm, about 30 μm, about 35 μm, about 36 μm, about 40 m, about 45 μm, or about 50 m.

Figure 2:
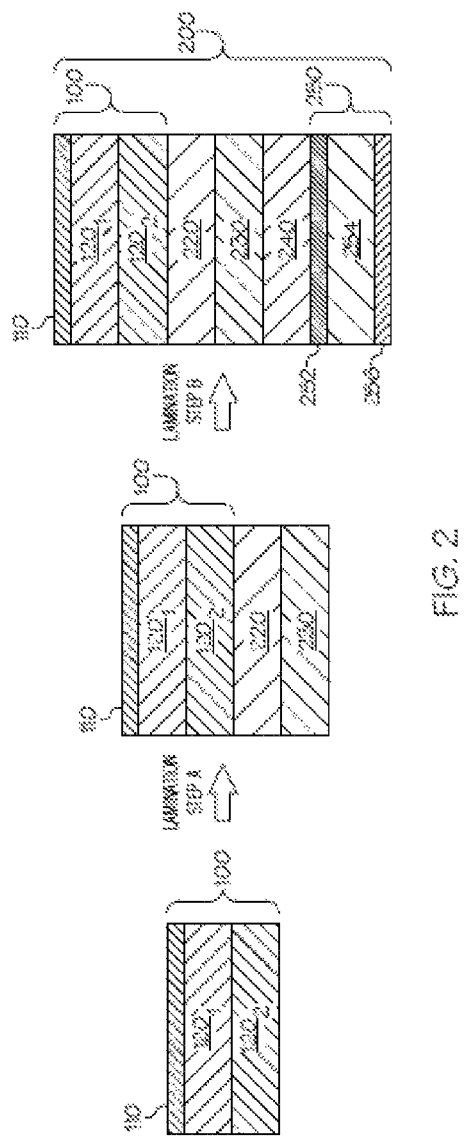
FIG. 2 is a schematic diagram of a lamination process of forming an exemplary laminate structure with any of the exemplary multilayer films of FIGS. 1A-1C, according to one or more embodiments shown and described herein.
Figure 5A:
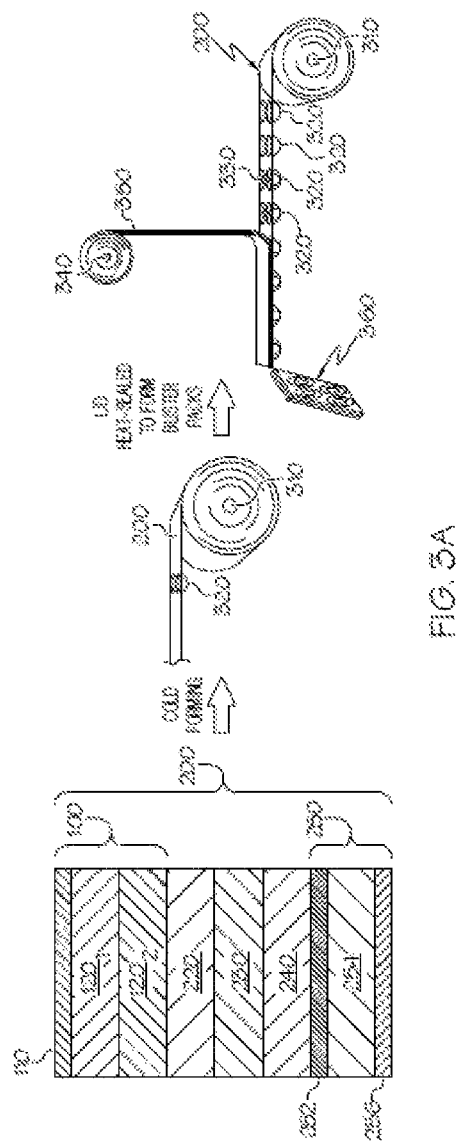

FIG. 2 is a schematic diagram of a lamination process of forming an exemplary laminate structure 200 with any of the exemplary multilayer films 100 of FIGS. 1A-1C. In embodiments, a laminate structure 200 may include multilayer film 100 laminated to a core structure. The core structure may include at least one layer exhibiting a metaphasic transition such as, for example, a layer of metaphasic PET. In embodiments, the core structure may include, for example, a trilayer metaphasic structure 250. In the laminate structure 200, additional layers may be interposed between the multilayer film 100 and the core structure such as the trilayer metaphasic structure 250. For example, an intermediate layer 230 may be interposed between the multilayer film 100 and the core structure such as the trilayer metaphasic structure 250. In example embodiments, the intermediate layer 230 may be a soft metal foil such as a soft aluminum foil. The intermediate layer 230 may be adhered to the multilayer film 100 by a first adhesive layer 220 between the intermediate layer 230 and the multilayer film 100. The intermediate layer 230 may be adhered to the core structure such as the trilayer metaphasic structure 250, for example, by a second adhesive layer 240 between the intermediate layer 230 and the core structure. Exemplary lamination processes for forming the laminate structure 200 will now be described.

As shown in FIG. 2, the laminate structure 200 is formed over Lamination Step A and Lamination Step B. During Lamination Step A, the multilayer film 100 is laminated to an intermediate layer 230 with a first adhesive layer 220 such that the first adhesive layer 220 is between the second formable layer $120_2$ and the intermediate layer 230. In some embodiments, the intermediate layer 230 is formed from a soft aluminum foil. In some embodiments, the first adhesive layer 220 is ADCOTE® 811A+COREACTANT F, produced by Rohm and Haas Chemicals LLC, Philadelphia, PA In other embodiments, adhesives based on reactions of polyols and urethane prepolymers may be used.

During Lamination Step B, a trilayer metaphasic structure 250 is laminated to the intermediate layer 230 with a second adhesive layer 240, substantially similar to the first adhesive layer 220, such that the second adhesive layer 240 is between the intermediate layer 230 and the trilayer metaphasic structure 250. In some embodiments, the trilayer metaphasic structure 250 has an A-B-A structure including a first PET layer 252, a second PET layer 256 and a silica-containing PET layer 254 interposed between the first PET layer 252 and the second PET layer 256. Thus, the intermediate layer 230 is placed between the second formable layer $120_2$ and the first PET layer 252. In some embodiments, the first PET layer 252 and the second PET layer 256 are formed from a biaxially-oriented PET layer having a metaphase evidenced by a metaphase transition present at about 180° C. to about 200° C. as measured by DSC upon a first heating and a molded volume of greater than or equal to about 200%.

In some embodiments, one or more layers of thermoplastic material such as, but not limited to, polyethylene, polypropylene, nylon, polystyrene, PET, polylactic acid, and PVC may be disposed in addition to or instead of the trilayer metaphasic structure 250. Such additional layers may be incorporated through additional lamination steps. The lamination process shown in FIG. 2 yields an exemplary laminate structure 200 that can be used for preparing a blister package 300, as described below.

Figure 3B:
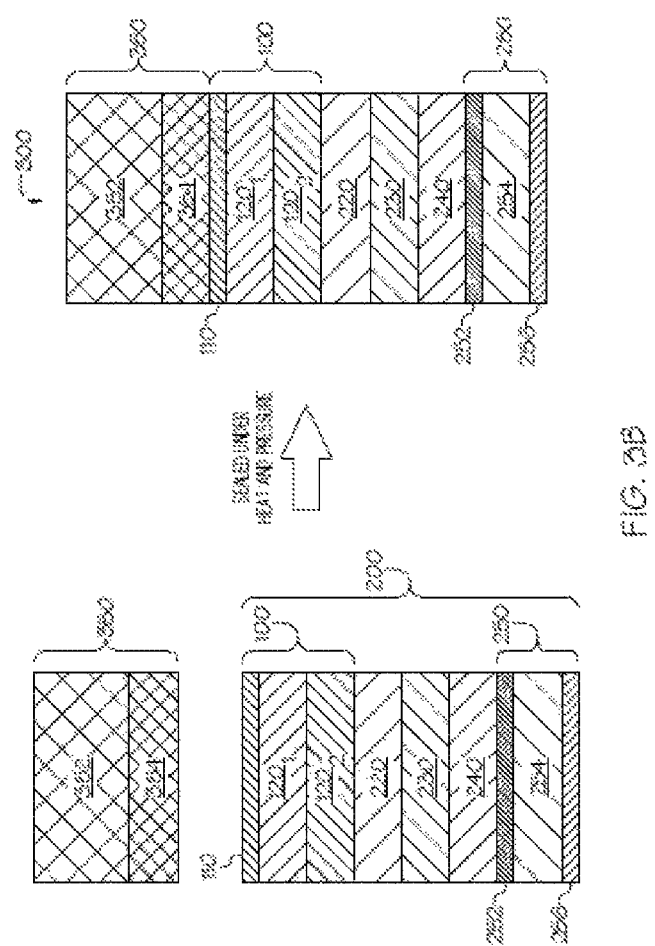
FIG. 3B is a schematic diagram of forming a blister pack after sealing the exemplary laminate structure of FIG. 2 with the lid layer, according to one or more embodiments shown and described herein.

FIGS. 3A-3B depict the formation of a blister package 300 from the exemplary laminate structure 200. In particular, FIG. 3A depicts a schematic diagram of a sealing process of bonding a lid layer 350 with the exemplary laminate structure 200 to prepare the blister package 300, while FIG. 3B depicts a schematic diagram of forming a blister pack 360 after sealing the exemplary laminate structure 200 with the lid layer 350. As shown in FIG. 3A, the lid layer 350 comprises the strain-hardened aluminum foil layer 352 having a sealing surface 353. Strain-hardened aluminum foil is typically brittle and can be punctured easily to retrieve contents of the blister package 300. The sealing surface 353 is coated with the lacquer layer 354. During the sealing process, the outer surface 112 of the sealing layer 110 is directly pressed against a bottom surface 355 of the lacquer layer 354 and heated to a temperature above 85° C. to form the blister package 300. Accordingly, the lid layer 350 is laminated with the multilayer laminate structure 200 under heat and pressure to form the blister package 300.

As shown in FIG. 3B, the laminate structure 200 rolled around an unwinder 310 is passed through a die to make a plurality of wells 320 by applying pressure, typically between 4 and 6 kg/cm². The plurality of wells 320 are formed by a well-forming part (not shown) at a speed between about 20 to about 30 blisters per minute. A product 330 is then inserted in each of the plurality of wells 320. The product 330 may be a food product, a medicinal product, or another commercial product. The lid layer 350 rolled around a spindle 340 is pressed against the laminate structure 200 and heat-sealed to form the blister package 300, as described above. Finally, individual blister packs 360 are punched off from the blister package 300.

The apparatuses and methods described herein can be advantageously used for preparing a laminate structure of formable films that can be easily heat-sealable to a lid layer of strain-hardened aluminum foil to form a blister package, without requiring additional coatings for enhancing bonding between the laminate structure and the lid layer. When additional coatings are used, the laminate structure must be processed through the laminating machine a second time to add the additional coating. However, since additional coatings are no longer needed by virtue of the co-extruded sealing layer in the laminate structure, the laminating machine need only be used once. This results in significant savings in manufacturing cost and time, while improving the overall construction of the blister package at the same time.

The following specific but non-limiting example, Example A demonstrates the seal strength of the sealing layer in the laminate structure through experimentally-verified data.

Example A—Measurement of Seal Strength of the Sealing Layer

The seal strength of the sealing layer described in the present disclosure was examined using a first specimen of the sealing layer partially heat-sealed on one surface to a strain-hardened aluminum foil layer coated with a lacquer layer on the sealing surface and a second specimen of the sealing layer partially heat-sealed on both surfaces to strain-hardened aluminum foil layers coated with lacquer layers on the sealing surfaces. The test measured the force needed to separate the sealing layer from the strain-hardened aluminum foil layer(s) by gripping the unsealed portions of the strain-hardened aluminum foil layer(s) in the movable jaws of a tensile tester and then moving the jaws of the tensile tester with a constant strain rate to pull the sealed portions of the strain-hardened aluminum foil layer(s) apart.

Conditions of testing were followed per standardized guidelines of ASTM D 882 and ASTM F 88. The force applied and displacement on the sealing layer was continuously measured. The seal strength was measured as the amount of force needed (in grams) per 25 mm of width of the specimen to separate the sealing layer from the strain-hardened aluminum foil layer(s). For each specimen, the minimum, maximum, and average force needed to break the seal was measured at different temperatures (100° C., 110° C., 120° C., 130° C., 140° C., 150° C., 160° C., 170° C., 180° C., 190° C., 200° C., and 210° C.) and compared against a benchmark desired seal strength of greater than 500 g/25 mm. The data from the test is shown in Table 1 below and demonstrates high seal strength in all cases.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:
1. A laminate structure comprising:
   a multilayer film comprising:
      a first formable layer comprising biaxially-oriented PET having a metaphase evidenced by a metaphase transition at about 180° C. to about 200° C. as measured by differential scanning calorimetry (DSC) upon a first heating; and
      a sealing layer comprising a copolyester material, the sealing layer overlying the first formable layer and having an outer surface opposite the first formable layer, the sealing layer having a crystallinity from 10% to 20% as measured by differential scanning calorimetry (DSC);
   a core structure comprising a first PET layer, a second PET layer, and a silica-containing PET layer interposed between the first PET layer and the second PET layer, wherein at least one layer of the core structure has a metaphase transition at about 180° C. to about 200° C. as measured by differential scanning calorimetry (DSC) upon a first heating and has a molded volume of greater than or equal to about 200%; and

TABLE 1

Seal Strength data from tensile tester

| | | Seal Strength (g/25 mm) | | | | | | | | | | | | | | |
|---|---|---|---|---|---|---|---|---|---|---|---|---|---|---|---|---|
| | | Without Support Pressure | | | | | | | | | With Support of Al/Alu Laminate Pressure | | | | | |
| | | 3.0 kg | | | 4.0 kg | | | 5.0 kg | | | 4.0 kg | | | 5.0 kg | | |
| Sr. No. | Temp (° C.) | Min | Max | Avg | Min | Max | Avg | Min | Max | Avg | Min | Max | Avg | Min | Max | Avg |
| 1 | 100 | 430 | 720 | 575 | 375 | 800 | 590 | 560 | 740 | 650 | — | — | — | — | — | — |
| 2 | 110 | 845 | 1180 | 1015 | 830 | 1100 | 965 | 775 | 1150 | 965 | — | — | — | — | — | — |
| 3 | 120 | 760 | 1065 | 915 | 325 | 920 | 620 | 905 | 960 | 930 | — | — | — | — | — | — |
| 4 | 130 | 610 | 670 | 640 | 445 | 915 | 680 | 380 | 675 | 530 | — | — | — | — | — | — |
| 5 | 140 | 510 | 690 | 600 | 360 | 790 | 575 | 435 | 780 | 605 | — | — | — | — | — | — |
| 6 | 150 | 500 | 565 | 535 | 565 | 915 | 740 | 565 | 895 | 730 | 695 | 710 | 700 | 565 | 660 | 610 |
| 7 | 160 | 500 | 760 | 630 | 575 | 750 | 660 | 830 | 715 | 770 | 555 | 800 | 675 | 400 | 760 | 580 |
| 8 | 170 | 510 | 720 | 615 | 565 | 610 | 585 | 750 | 785 | 770 | 480 | 950 | 715 | 595 | 1000 | 800 |
| 9 | 180 | 595 | 955 | 775 | 610 | 885 | 750 | 645 | 1155 | 900 | 645 | 710 | 680 | 460 | 925 | 695 |
| 10 | 190 | 290 | 420 | 355 | 365 | 680 | 520 | 465 | 680 | 570 | 430 | 945 | 690 | 535 | 885 | 710 |
| 11 | 200 | 425 | 740 | 585 | 490 | 535 | 515 | 345 | 1035 | 690 | 520 | 850 | 685 | 355 | 565 | 460 |
| 12 | 210 | 495 | 620 | 555 | 350 | 625 | 490 | 360 | 770 | 565 | 770 | 875 | 820 | 645 | 810 | 730 | an intermediate layer comprising a soft metal foil interposed between the multilayer film and the core structure.

2. The laminate structure of claim 1, wherein the outer surface of the sealing layer is heat-sealable directly to a lacquer layer coated on a strain-hardened aluminum foil.

3. The laminate structure of claim 1, wherein the copolyester material is selected from the group consisting of copolyesters of isophthalic acid, copolyesters of ethylene glycol, copolyesters of diethylene glycol (DEG), copolyesters of triethylene glycol (TEG), copolyesters of cyclohexanedimethanol (CHDM)-modified PET, copolyesters of n-propylene glycol, and copolyesters of n-butylene glycol.

4. The laminate structure of claim 1, wherein the biaxially-oriented PET layer has a molded volume of greater than or equal to about 200%.

5. The laminate structure of claim 4, wherein the first formable layer is interposed between the sealing layer and a second formable layer comprising biaxially-oriented PET having a metaphase evidenced by a metaphase transition at about 180° C. to about 200° C. as measured by differential scanning calorimetry (DSC) upon a first heating.

6. A blister package for packaging a product, the blister package comprising:
    a lid layer comprising a strain-hardened aluminum foil and a lacquer layer on a sealing surface of the strain-hardened aluminum foil; and
    a laminate structure sealed directly to the lacquer layer, the laminate structure comprising:
        a multilayer film and a plurality of wells formed therethrough, wherein the multilayer film comprises:
            a first formable layer comprising biaxially-oriented PET having a metaphase evidenced by a metaphase transition at about 180° C. to about 200° C. as measured by differential scanning calorimetry (DSC) upon a first heating; and
            a sealing layer comprising a copolyester material, the sealing layer overlying the first formable layer and comprising an outer surface opposite the first formable layer, wherein the sealing layer has a crystallinity from 10% to 20% as measured by DSC, wherein the outer surface of the sealing layer is sealed directly to the lacquer layer;
        a core structure comprising a first PET layer, a second PET layer, and a silica-containing PET layer interposed between the first PET layer and the second PET layer, wherein at least one layer of the core structure has a metaphase transition at about 180° C. to about 200° C. as measured by differential scanning calorimetry (DSC) upon a first heating and has a molded volume of greater than or equal to about 200%; and
        an intermediate layer comprising a soft metal foil interposed between the multilayer film and the core structure.

7. The blister package of claim 6, wherein the laminate structure further comprises one or more additional layers laminated to the multilayer film, the one or more additional layers selected from an aluminum foil layer, a polyvinyl chloride (PVC) layer and an adhesive layer.

8. The blister package of claim 6, wherein the copolyester material is selected from the group consisting of copolyesters of isophthalic acid, copolyesters of ethylene glycol, copolyesters of diethylene glycol (DEG), copolyesters of triethylene glycol (TEG), copolyesters of cyclohexanedimethanol (CHDM)-modified PET, copolyesters of n-propylene glycol, and copolyesters of n-butylene glycol.

9. The blister package of claim 6, wherein the biaxially-oriented PET layer has
    a molded volume of greater than or equal to about 200%.

10. The blister package of claim 6, wherein the multilayer film further comprises at least an additional biaxially-oriented PET layer having:
    a metaphase with a metaphase transition present at about 180° C. to about 200° C. as measured by differential scanning calorimetry (DSC) upon a first heating; and
    a molded volume of greater than or equal to about 200%.

11. The blister package of claim 6, wherein the sealing layer has a thickness from about 1.5 microns to about 4 microns.

12. A method for preparing a blister package, the method comprising:
    laminating a lid layer and a multilayer laminate structure under heat and pressure to form the blister package, the lid layer comprising a strain-hardened aluminum foil having a lacquer layer on a sealing surface of the strain-hardened aluminum foil, the laminate structure comprising:
        a multilayer film comprising:
            a first formable layer comprising-a thermoplastic material biaxially-oriented PET having a metaphase evidenced by a metaphase transition at about 180° C. to about 200° C. as measured by differential scanning calorimetry (DSC) upon a first heating; and
            a sealing layer comprising a copolyester material, the sealing layer overlying the first formable layer and having an outer surface opposite the first formable layer, the sealing layer having a crystallinity from 5% to 20% 10% to 20% as measured by DSC;
        a core structure comprising a first PET layer, a second PET layer, and a silica-containing PET layer interposed between the first PET layer and the second PET layer, wherein at least one layer of the core structure has a metaphase transition at about 180° C. to about 200° C. as measured by differential scanning calorimetry (DSC) upon a first heating and has a molded volume of greater than or equal to about 200%; and
        an intermediate layer comprising a soft metal foil interposed between the multilayer film and the core structure,
    wherein during the laminating, the outer surface of the sealing layer is pressed directly against the lacquer layer.

13. The method of claim 12, wherein the copolyester material is selected from the group consisting of copolyesters of isophthalic acid, copolyesters of ethylene glycol, copolyesters of diethylene glycol (DEG), copolyesters of triethylene glycol (TEG), copolyesters of cyclohexanedimethanol (CHDM)-modified PET, copolyesters of n-propylene glycol, and copolyesters of n-butylene glycol.

14. The method of claim 12, wherein the biaxially-oriented PET has:
    a molded volume of greater than or equal to about 200%.

15. The method of claim 12, wherein the multilayer film further comprises a second formable layer comprising biaxially-oriented PET having a metaphase evidenced by a metaphase transition at about 180° C. to about 200° C. as measured by differential scanning calorimetry (DSC) upon a first heating, the first formable layer being interposed between the sealing layer and the second formable layer.

16. The method of claim 15, wherein the multilayer film further comprises:
a first adhesive layer between the second formable layer and the intermediate layer; and
a second adhesive layer between the intermediate layer and the core structure.

17. The laminate structure of claim 1, wherein each of the first PET layer and the second PET layer comprise biaxially-oriented PET having a metaphase evidenced by a metaphase transition present at about 180° C. to about 200° C. as measured by DSC upon a first heating.

18. The laminate structure of claim 5, further comprising:
a first adhesive layer between the second formable layer and the intermediate layer; and
a second adhesive layer between the intermediate layer and the core structure.

* * * * *